United States Patent [19]

Mitchell

[11] Patent Number: 5,253,716

[45] Date of Patent: Oct. 19, 1993

[54] FOG PRODUCIG FIREFIGHTING TOOL

[76] Inventor: Wallace F. Mitchell, St. Mary's Rd. and Hwy. 60, Mettawa, Ill. 60069

[21] Appl. No.: 799,284

[22] Filed: Nov. 27, 1991

[51] Int. Cl.⁵ .......................................... A62C 31/22
[52] U.S. Cl. .................................. 169/70; 239/544; 285/361
[58] Field of Search .................... 169/70, 54, 52; 239/271, DIG. 13, 544; 285/89, 90, 318, 361, 402

[56] References Cited

U.S. PATENT DOCUMENTS

| | | | |
|---|---|---|---|
| 919,743 | 4/1909 | Mason | 285/361 |
| 966,925 | 8/1910 | Kittrege | 285/361 X |
| 995,966 | 6/1911 | Hill | 285/361 X |
| 1,001,994 | 8/1911 | Schneider | 285/361 X |
| 1,020,258 | 3/1912 | Bundy | 285/402 X |
| 1,117,762 | 11/1914 | Barcus | 285/375 X |
| 2,224,010 | 12/1940 | Barber | 239/271 |
| 2,245,847 | 6/1941 | Bagby | 285/361 X |
| 2,323,464 | 7/1943 | Glessner | 239/544 X |
| 2,334,395 | 11/1943 | Dowell et al. | 239/271 |
| 2,343,305 | 3/1944 | Larter | 239/544 |
| 2,413,083 | 12/1946 | Snowden et al. | 169/70 X |
| 2,647,800 | 8/1953 | Burnam et al. | 239/543 |
| 2,813,753 | 11/1957 | Roberts | 239/271 |
| 2,993,650 | 7/1961 | Badberg | 239/271 |
| 3,107,060 | 10/1963 | Coursey, Jr. | 239/543 |
| 3,201,151 | 8/1965 | Westveer | 285/361 X |
| 4,147,216 | 4/1979 | Schaepfe, Jr. et al. | 169/70 |
| 4,271,909 | 6/1981 | Chatfield et al. | 239/271 X |
| 4,313,626 | 2/1982 | Duncan | 285/402 X |
| 4,485,877 | 12/1984 | McMillan et al. | 169/48 |
| 4,611,662 | 9/1986 | Harrington | 285/402 X |
| 4,625,808 | 12/1986 | Halfpenny | 169/70 X |
| 4,676,319 | 6/1987 | Cuthbertson | 169/70 |
| 4,697,740 | 10/1987 | Ivy | 239/271 |
| 4,700,894 | 10/1987 | Grzych | 169/70 X |
| 4,802,535 | 2/1989 | Bakke | 169/70 |
| 5,062,486 | 11/1991 | McClenahan | 169/70 |

FOREIGN PATENT DOCUMENTS

| | | | |
|---|---|---|---|
| 1097929 | 1/1961 | Fed. Rep. of Germany | 285/402 |
| 464166 | 4/1937 | United Kingdom | 239/271 |
| 982018 | 2/1965 | United Kingdom | 285/361 |

Primary Examiner—David M. Mitchell
Assistant Examiner—Andrew C. Pike
Attorney, Agent, or Firm—Patnaude, Videbeck & Marsh

[57] ABSTRACT

A fog producing firefighting tool has a nozzle which includes a plurality of apertures oriented so that when pressurized fluid flows through each aperture, the liquid impacts at an angle of 90 degrees with another stream of liquid to atomize the liquid and create a fog. The firefighting tool is of modular construction which includes a first member, one or more intermediate members, and an end member wherein the members are connected to each other by means of quick coupler devices which can be readily locked into coupled relationship and will not interfere with the usage of the tool when it is forced into or removed from a hole in a structure.

3 Claims, 3 Drawing Sheets

FOG PRODUCIG FIREFIGHTING TOOL

BACKGROUND OF THE INVENTION

This invention relates to fog producing firefighting tools and, more particularly, to a collapsible firefighting tool having modular sections attached together by quick connect/disconnect couplings.

The use of conventional firehose nozzles which eject a straight stream of liquid are well known in the art. Such nozzles, however, are clearly not advantageous in all firefighting scenarios. It is common knowledge that a fire requires oxygen, and a combustible material heated to a combustion temperature. The removal of any of these elements results in the fire being put out. In many situations, the destruction of various parts of a structure is necessary to reach a fire spreading in a closed area. Since the combustion of articles in a closed area is dependent upon the supply of oxygen, the creation of large holes into the area is disadvantageous since oxygen is allowed to rush through the hole. Any articles which are at the point of combustion will begin to combust in the presence of the oxygen. Still further, the destruction of a structure necessarily involves the loss of time in the primary objective of putting out the fire.

The use of the conventional firehose also means the waste of a great amount of water since a straight stream of water only covers the area of the fire to which the hose is being directed.

Water has a great heat absorbing capacity and the speed at which water absorbs heat is related to the surface area of the water which is exposed. Water from a conventional fire hose frequently runs in streams away from the fire location or forms pools underneath the fire zone such that its fire fighting capabilities are lost. The effectiveness of water in fire fighting is improved when the water is fed to the fire in the form of a fog. Some of the prior art nozzles which provide a fog or mist are shown by U.S. Pat. Nos. 2,993,650; 2,343,305; 2,813,753 and 3,107,060. Such nozzles generally provide narrow output orifices and therefore cannot accommodate the large volume of water available from a fire hose, and often require high water pressure for proper operation.

The present invention is directed toward overcoming one or more of the problems set forth above.

SUMMARY OF THE INVENTION

The purpose of the invention is to provide an improved fog producing fire fighting tool. When a fog of water engages a fire, the water in the fog has a large surface area which absorbs the heat of the fire and converts the liquid to steam. The absorption of heat is maximized when water is atomized in a fog, and if such a fog is continuously fed to a fire and heat is absorbed faster than it is produced by the fire the temperature of the fire zone will drop below that needed for combustion and the fire will be extinguished. Furthermore, the steam formed will occupy a much greater volume than water and will displace surrounding oxygen and thereby reduce the rate at which energy is created in the fire.

In one aspect of the present invention, a nozzle is provided having a elongated body including an outer surface, a bore partially therethrough defining an inner surface and an open end, means for connecting a body at a bore open end to a pressurized liquid source, and a plurality of apertures extending through the body between the outer surface and the bore inner surface. The apertures are oriented such that when the connecting means connects the body to a source of pressurized liquid, the liquid flows outwardly through each aperture and the outward flow from each of the apertures impacts upon the outward flow from another aperture at an angle of ninety degrees to create a fog.

According to the invention, the nozzle herein above described may be a component of a firefighting tool wherein the nozzle comprises a diverging end portion with a tetrahedron shape of solid construction such that the nozzle can be used to pierce a structure. An elongated tubular member having an open end is connected to the nozzle at its open end so that pressurized liquid is allowed to flow through the tubular member and through the bore.

Additionally, the nozzle herein above described may be a component of a firefighting tool of modular construction comprising the nozzle with a diverging end portion, a first tubular member, an intermediate tubular member, and an end tubular member, where the tubular members are jointed at their open ends by quick connect/disconnect bayonet type couplings.

Furthermore, the coupling which joins the various tubular sections together are provided with converging ends such that usage of the tool will not be hampered when the tool is forced into or pulled out of a hole in a structure. The coupling is also provided with a lock nut which is freely slidable along the various tubular members when the lock nut is not secured, and which locks the coupling to maintain the associated tubular members in coupled relationship.

A final feature of the invention is that the input part through which water would enter the tool can be oriented at an angle of 90 degrees or more with the tool to enable the tool to be used to pierce a structure which has a surface parallel to the orientation of the connecting firehose, such as a floor or ceiling, or to be hooked through angular structures such as a roof.

The present invention thus provides a nozzle capable of producing a fog. Since the fog envelopes a greater volume of fire than the stream of liquid from a conventional firehose, the fire will be extinguished more quickly, minimizing damage to structure. Further, the tool can easily be assembled at the scene of the fire and its length adjusted to conform with the structural limitations of the site.

The present invention also provides a firefighting tool which minimizes the damage to existing structure by allowing structures such as doors, ceilings, walls, and roofs, to be pierced with a small hole rather than being destroyed. Further, the size of the hole which results from the piercing minimizes oxygen necessary for combustion from being supplied to the fire.

Still further, the present invention provides for better and more efficient use of water which, in turn, permits more effective fire firefighting capability with the limited amounts of water, such as in rural areas.

The present invention additionally provides a firefighting tool of modular construction wherein the members are easily connected, is securely locked together by the lock nut when in use, and of construction to allow the same to be forced or driven through various structures and materials.

Other aspects and features of the invention will be apparent from the following detailed description taken in connection with the accompanying drawings.

DESCRIPTION OF THE PREFERRED EMBODIMENT

Figure 1:
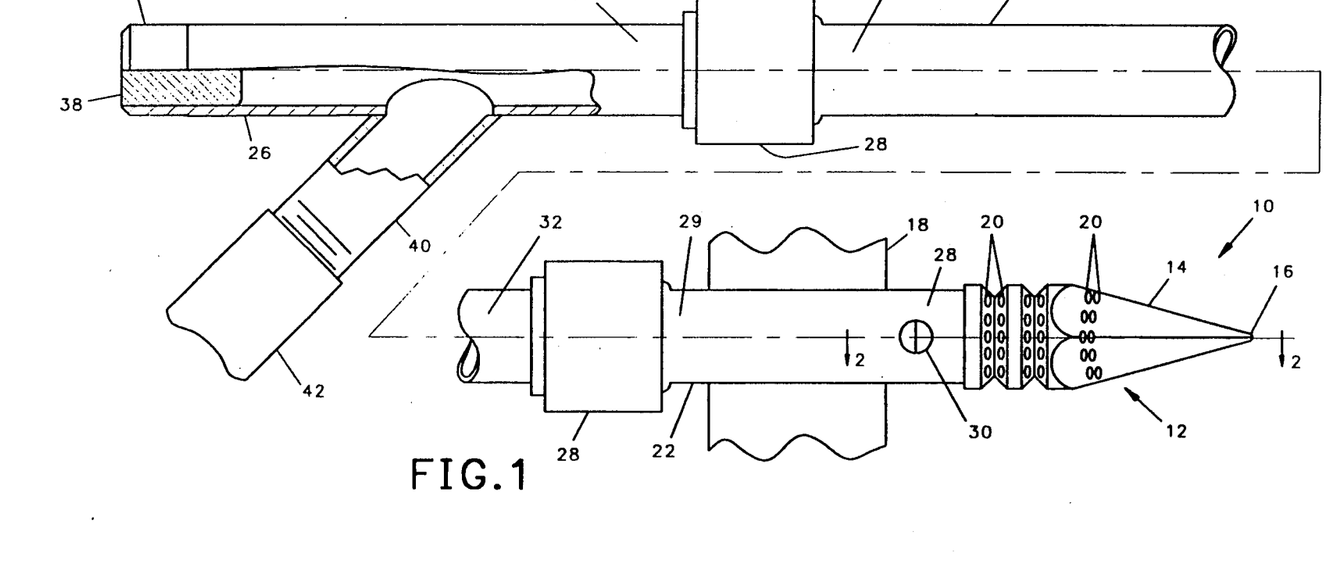
FIG. 1 is a perspective view illustrating the firefighting tool of the present invention.

A bayonet end firefighting tool 10 according to the present invention, illustrated in FIG. 1, includes a nozzle 12 with diverging end portion 14 of solid construction having a distal end 16 such that the nozzle distal end 16 can be used to pierce a structure 18 such as wall, ceiling, roof, window, etc. In the exemplary embodiment, the end portion 14 has a plurality of flat surfaces 13 separated by cutting edges 15, and thereby provides a useful tool for penetrating a structure. The material of end portion 14 is typically a tough core, case hardened steel. In the exemplary embodiment of the invention, nozzle 10, including the protruding and internal portions, has a length of approximately seven inches and an outer diameter of approximately 1¾ inches.

Figure 2:
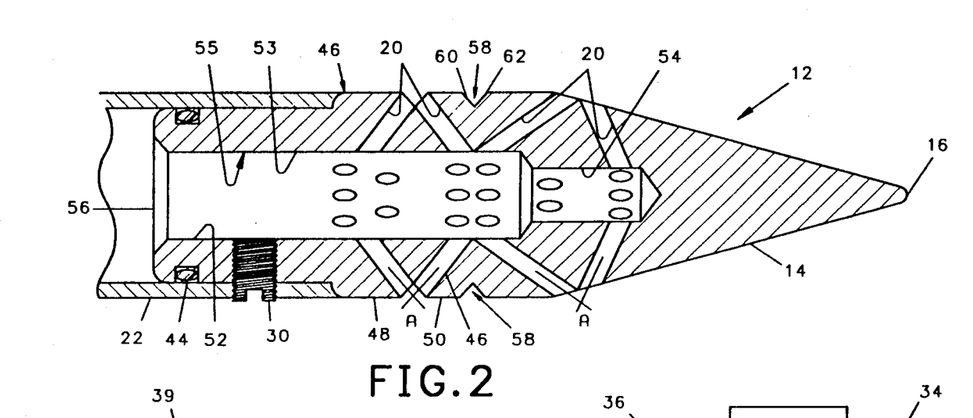
FIG. 2 is a cross-sectional view illustrating the fog nozzle of the present invention, taken generally along the lien 2—2 of FIG. 1.

The nozzle further includes a plurality of apertures 20. In the exemplary embodiment, and as shown in FIG. 2, the apertures 20 are arranged in pairs and oriented such that when pressurized liquid flows through each of the pairs of apertures 20, the streams of liquid from each aperture meet at a point A. As a result thereof, the liquid is atomized and a fog is created. The apertures are also oriented such that the thrust created by the liquid escaping from each aperture is balanced against the thrust created by liquid escaping from one other aperture such that the tool is not subjected to a force ejecting it from or injecting it into an opening when in use. The exemplary embodiment of the nozzle includes forty apertures, wherein each aperture is approximately one-eighth of an inch in diameter. Assuming that water is used as the liquid, the fog created will occupy a volume much greater than the volume occupied by water directed from a conventional firehose since the volume occupied by a drop of water in its steam state is approximately 1,700 times the volume covered by a drop of water in its liquid state. Therefore, the fire will be extinguished faster and less water will be used. Furthermore, a fully atomized fog, as opposed to a mist, is capable of travelling around corners to extinguish a fire, which is not possible with a stream of water.

The firefighting tool 10 further includes an elongated tubular body which comprises an elongated first tubular member 22, an elongated intermediate tubular member 24, and an elongated end tubular member 26 which are assembled in end to end relationship to each other to form a substantially straight tubular tool. The elongated tubular members 22, 24, and 26 each define a passageway through which pressurized liquid is allowed to flow. In the exemplary embodiment of the present invention, each of the elongated tubular members 22, 24 and 26 are approximately twenty six inches in length and 1¾ inches in diameter. Therefore, the overall length of the firefighting tool 10, shown in FIG. 2, is approximately seven feet and its weight is approximately twenty-one pounds.

The first tubular member 22 has respective first and second open end portions 28 and 29. The intermediate tubular member has respective first and second open end portions 32 and 34. The end tubular member 26 has an open end portion 36, a closed end portion 38 which includes an end cap 39, and a tubular inlet port 40. The end cap 39 is included so that the closed end portion 38 of the firefighting tool 10 can withstand the blows of a sledge hammer or the like, wherein the sledge hammer provides the force necessary to drive the firefighting tool 10 through a structure. Although the principal axis of the tubular inlet port 40 shown in FIG. 1 is oriented at a forty-five degree angle relative to the centerline of the end member 26, it should be noted that firefighting hoses are heavy and not easily flexed when in use and the principal longitudinal inlet port 40 can be oriented to any degree necessary to suit the firefighting tool's particular application. Specifically, referring to FIG. 7, a tubular inlet port oriented at a ninety degree angle relative to the centerline of the end member 26A as is port 40A would be advantageous wherein the firefighting tool 10 is used to pierce through horizontal structures such as ceilings and floors or the like. Similarly, an inlet port oriented at an angle relative to the end member 26 extending toward the nozzle 12 which is greater than ninety degrees, for example, one hundred twenty degrees, would permit the tool to be hooked through roofs and the like.

The first open end portion 28 of the first member 22 is connected to the nozzle 12 by means of a screw 30, or the like. The intermediate member 24, at the first open end portion 32 thereof, is connected to the first member 22 at the second open end portion 29 by means of a quick coupler 41. The end member 26 at open end portion 36 is connected to the intermediate member 24 at open end portion 34 thereof by means of a second quick coupler 41. The inlet port 40 is connected to a source of pressurized liquid 42 in a conventional manner.

FIG. 2 shows the first member 22 telescoping a portion of the nozzle 12 and coupled thereto by means of the screw 30. An O-ring 44 assures a watertight fit between the two parts. The nozzle 12 comprises an elongated body 46 having a cylindrical portion 48 and the diverging portion 14, the elongated body 46 defining an outer surface 50. A bore 52 comprised of a portion 53 and a portion 54 of reduced diameter extends coaxially through the elongated body 46 and defines an inner surface 55 and an open end 56. As shown in FIG.

2, the portion 53 extends coaxially through the cylindrical portion of the elongated body 46 while the portion 54 of reduced diameter extends partially into the diverging end portion 14 of the elongated body 46. The plurality of pairs of apertures 20 extend through the body 46 between the outer surface 50 and the bore inner surface 55. As shown in FIG. 2, each aperture defines an axis. A pressurized liquid flowing through the bore 52 and each of the pairs of apertures 20 impacts at a point A wherein the axes of the apertures of each pair 20 intersect. The impacting of the two liquid streams atomizes the liquid and creates a fog of liquid. According to the preferred embodiment, the axes of each pair of apertures 20 occupy the same plane and intersect at a right angle.

It is desirable to maximize the volume of liquid passing through the nozzle and to maximize the dispersion of the liquid away from the nozzle while maintaining the atomization of the liquid to produce a fog. The maximum dispersion would occur by directing the stream outward from the nozzle without intersecting another stream, however, such a nozzle will not produce a fog. Prior art nozzles which provide a fog direct two streams of water against each other at acute angles so as not to overly reduce dispersion. Such prior art nozzles must emit streams of water at very high velocities to produce a fog, and as a result, such nozzles are provided with relatively small apertures. Atomization is maximized when the angle at which the streams intersect one another is maximized When the streams intersect at a ninety degree angle as is provided in accordance with the present invention, a fog may be produced with a nozzle having ⅛ inch diameter apertures, and the nozzle will operate at pressures as low as sixty PSI, and under higher pressures can disperse as much as one hundred seventy five gallons of liquid per minutes. Prior art nozzles, on the other hand, require pressures of one hundred PSI to operate effectively and they disperse far less water into a fog.

The nozzle 12 includes a plurality of continuous circumferential grooves 58 having connecting perpendicular groove surfaces 60, 62. The grooves 58 enable the liquid streams to be more accurately directed at the point A to improve atomization of the liquid, and additionally serve to protect the aperture exit points from being plugged when the firefighting tool is used to pierce a structure. The groove 58 can be provided with non-perpendicular groove surfaces 60, 62, and/or apertures 20 non-normal to the notch surfaces, as is obvious to those skilled in the art.

Figure 2A:
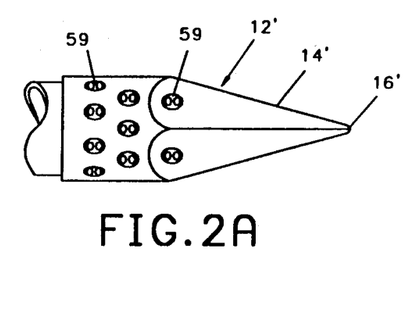
FIG. 2A is a fragmentary perspective view of an alternate embodiment of a nozzle in accordance with the present invention.

Alternatively, and as shown in FIG. 2A, the nozzle 12' may include a plurality of discrete notches 59, one associated with each pair of apertures 20', located around the outer surface of the nozzle 12'. The notches 59 recess the apertures 20 and protect the apertures from being clogged by particles as the tool is forced against a barrier. The nozzle 12' includes an end portion 14'. In all other respects, the nozzle 12' is similar to the nozzle 12 depicted in FIG. 2.

Figure 3:
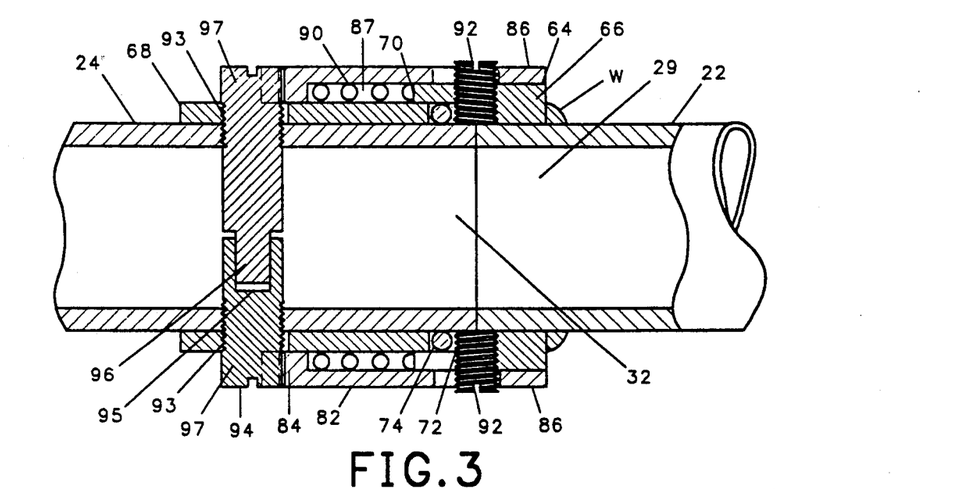
FIG. 3 is a cross-sectional view illustrating a coupling device of the firefighting tool of FIG. 1 in its locked position.
Figure 4:
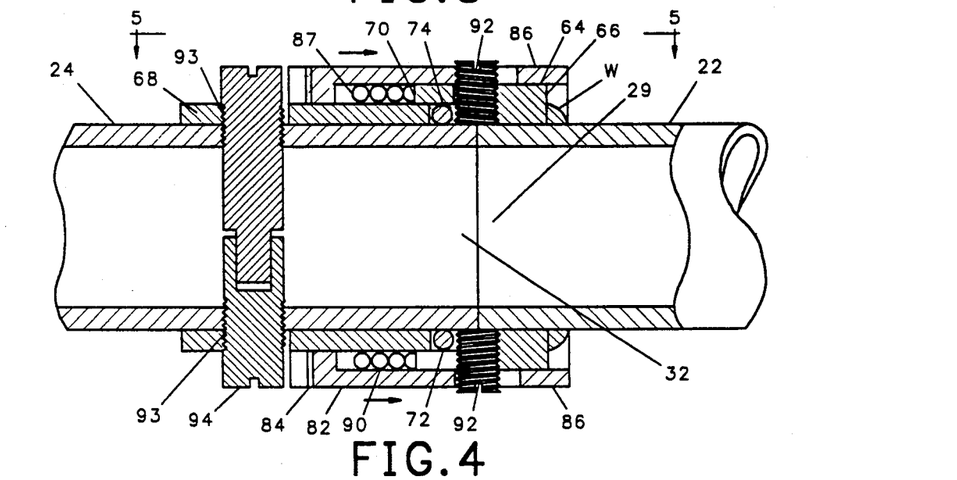
FIG. 4 is a cross-sectional view similar to FIG. 3 illustrating the coupling device in its unlocked position.
Figure 5:
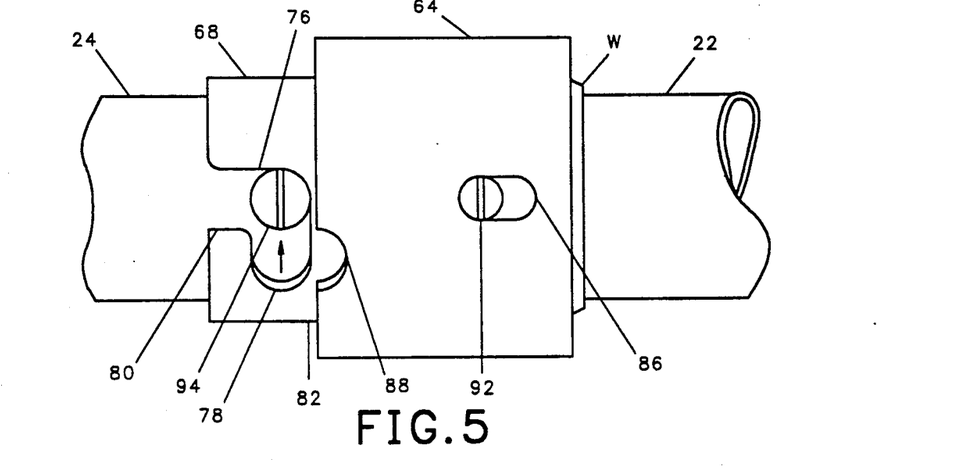
FIG. 5 is a top perspective view illustrating the coupling device in its unlocked position, taken generally along line 5—5 of FIG. 4.

FIGS. 3-5 illustrate a bayonet type coupling device 41. The coupling device 41 includes an inner collar 64. The inner collar 64 is of tubular construction and includes a first end portion 66, and a second end portion 68 having an outer radius smaller than the first end portion 66 and connected thereto by a shoulder portion 70. An inner circumferential groove 72 is provided in the first end portion 66 for receiving an O-ring 74 to provide a water tight seal between the inner collar 64 and the end portion 32 of the tubular member 24. The collar 64 is secured to the tubular member 22 as by welds W or the like. A pair of opposite L-shaped slots 76 are included at the end of the second end portion 68, see FIG. 5. The L-shaped slots 76 includes a closed end 78 and an open end 80.

An outer collar 82 includes an inner radius larger than the outer radius of the inner collar first end portion 66. The outer collar 82 includes a bushing end portion 84 defining an inner radius smaller than the radius of the inner collar first end portion 66 and larger than the radius of the inner collar second end portion 68. The outer collar 82 includes a pair of opposite elongated slots 86 therethrough remote from the bushing end 84 and a pair of opposite semicircular slots 88 at the bushing end 84, see FIG. 5.

The outer collar 82 is slidably mounted to the inner collar 64 and defines an inner circumferential passageway 87 therebetween for receiving a spring 90. The spring 90 normally biases the bushing end 84 of the outer collar 82 away from the shoulder portion 70 of the inner collar 64. A pair of screws 92, or the like, pass through each slot 86 in the outer collar 82 into suitable threaded openings in the first end portion 66 of the inner collar 64 to prevent circumferential movement of the outer collar 82 and to provide limited axial movement thereof. With the respective collars so mounted, the semicircular groove 88 is in circumferential alignment with the closed portion 78 of the L-shaped groove 76. The spring 90 biases the collars 64, 82 so that the bushing end 84 of the outer collar 82 partially covers the L-shaped groove 76, and such that a circular opening is formed by the semicircular groove 88 and the L-shaped groove 76.

The first end 32 of the tubular member 24 includes a pair of opposite apertures 93 to receive a pin 94 in the form of a split-thru bolt. The pin 94 is comprised of two threadably matable elements, one of the elements including a female portion 95 and the other including a male portion 96. The pin 94 is designed to perform a locking function and is not designed to absorb the hammering loads applied to the striking plate 39 at the end of the member 26. That is, the end of the members on the welded side are made to butt directly against the end of the member on the pin side such that the hammering loads are transferred from member to member only. In the event that an off-center hammering load is applied, the pin 94 may absorb some of the load. However, the split design prevents the breaking of the pin and loosening of the threads.

In the preferred method of operation, the firefighting tool 10 of the present invention includes the first member 22, and may include the intermediate member 24 or the end member 26. That is, the firefighting tool 10 may be used wherein the first member 22 is directly coupled to a source of pressurized liquid 42 or wherein it is coupled to the end member 26. Further, the firefighting tool 10 may include a plurality of intermediate members 24. Still further, the members may be of varying length to enable the tool 10 to be assembled to the length most suited to the structural limitations of the fire site. Notwithstanding the various combinations thereof, the method of operation is described according to the combination depicted in FIG. 1 First, the nozzle 12 is connected to the first member 22 at open end portion 28 by means of the screw 30. Next, the intermediate member 24 at the first open end portion 32 is coupled to the first member 22 at the second open end portion 30.

The coupling is accomplished by retracting the second collar 82 against the force of the spring 90 and sliding the intermediate member 24 axially such that the pin 94 mounted thereon is located within the open end 80 of the L-shaped groove 76, see FIGS. 4 and 5. Once located within the L-shaped groove 76, the intermediate member 24 is rotated clockwise such that the pin 94 abuts the closed end 78 of the L-shaped groove 76. At the same time, the outer collar 82 is released from its retracted position such that the pin 94 is captured by the semicircular groove 88 of the outer collar 82 locking the coupling in the same manner as a bayonet is customarily locked to the barrel of a rifle.

The end member 26 at the open end portion 36 is similarly coupled to the intermediate member 24 at the second open end portion 24 thereof using the second coupling device 41. Once the end member 26 is coupled, the inlet port 40 of the end member 26 may be connected to a source of pressurized liquid 42, as shown in FIG. 1.

At this time, a sledge hammer or the like is applied to the end of the firefighting tool 10 and provides the force necessary to drive the firefighting tool 10 through the structure 18. In some situations, the weight of the tool 10 together with the force exerted by one or more firemen will be sufficient to force the tool 10 through the structure 18. In still other situations, where the structure comprises very strong materials, it may be necessary to remove some of the materials before piercing the structure 18 with the tool 10. Once the firefighting tool 10 has pierced the structure 18, as shown in FIG. 1, the source of pressurized liquid may be turned on so that liquid flows through the end member 26, the intermediate member 24, the first member 22 and through the bore 52 of the nozzle 12. Thereafter, the liquid flows through the plurality of pairs of apertures 20 and impacts at the point A to create a fog.

Figures 6, 7, 8:
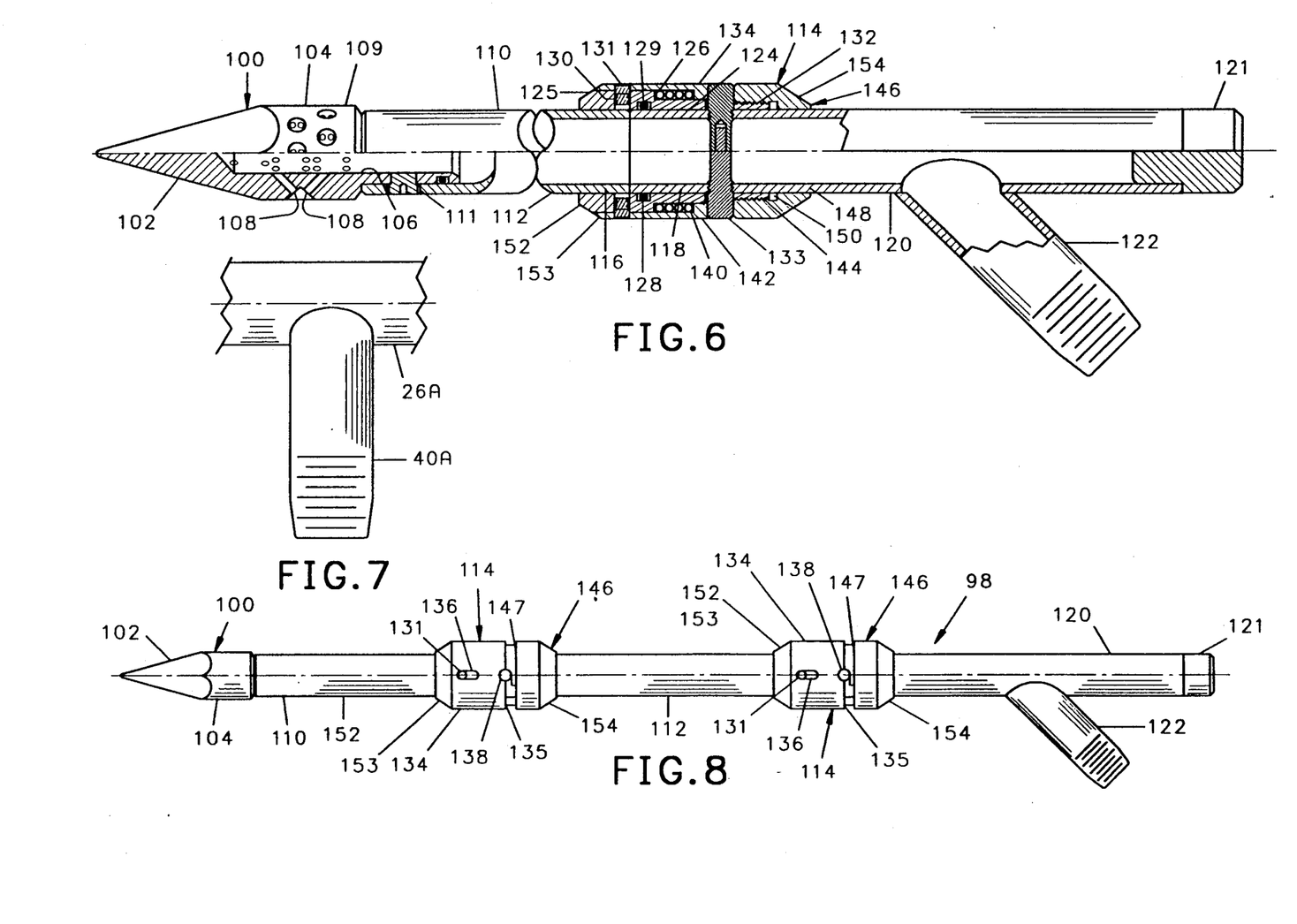
FIG. 6 is an enlarged fragmentary detail side elevational view of the present invention with the portions shown in section of a firefighting tool in accordance with the present invention and incorporating a second embodiment of the coupling device.
FIG. 7 is is a fragmentary side elevational view of a firefighting tool in accordance with the present invention showing an input port attached to one member of the tool at an angle of 90° with its principal axis.
FIG. 8 is a side elevational view of a firefighting tool in accordance with the present invention which is provided with the second embodiment of the coupling device.

A second embodiment of the bayonet type coupling is portrayed in FIG. 6 and FIG. 8. In this embodiment, a firefighting tool 98 has a nozzle 100 having a diverging end portion 102, an elongate body 104, an internal bore 106, and apertures 108 extending from the outer surface 109 of the body 104 to the bore 106 as previously disclosed. The nozzle 100 is attached at its open end to one end of a first tubular member 110, by a screw 111. The other end of the first tubular member 110 is attached to an open end 113 of a second tubular member 112, by a couple 114, and the first open end 116 of the second tubular member 112 is attached to the open end 118 of a third tubular member 120 by a second couple 114. The third tubular member 120 is provided with an end cap 121 and an input port 122 as has been previously described.

The couple 114 includes an inner collar 124, one end 125 of which is welded to one of the tubular sections, and is shown attached to the second tubular section 112 in FIG. 6. The inner collar 124 is provided with a shoulder 126, an internal circumferential groove 128 for receiving an O-ring 129, and a pair of screws 130 having protruding heads 131 threaded into suitable holes in opposite sides thereof. Adjacent the second end 132 of the inner collar 124 is a pair of L-shaped opposing slots, not shown, similar to slots 76 of the first embodiment for receiving a transverse pin 133 secured adjacent the open end 118 of the third tubular member 120. An outer collar 134 is slidably mounted over the inner collar 124 and has a bushing end 135, a pair of opposing longitudinally oriented slots 136 for receiving the heads 131 of the screw 130, opposing semi-circular grooves 138 in the bushing ends 135, and has an inner shoulder 140. A spring 142 is positioned within the inner passage formed between the inner collar 124 and the outer collar 134 and exerts an outward force against the shoulders 126 and 140 of the inner and outer collars 124, 134. The spring 142 urges the outer collar 134 toward the pin 133 such that the semi-circular grooves 138 will capture the transverse pin 133 when the open end of the third tubular member 120 is inserted into the end 132 of the inner collar 124 with the pin 133 positioned against the closed end of the L-shaped slots, not shown. As described above, the second embodiment of the coupling is identical in construction and operation to the first embodiment previously described.

Unlike the first embodiment, the second embodiment includes external threads 144 on the second end portion 132 of the inner collar 124. Furthermore, a lock nut 146 having a bushing end 147 is positioned on the third tubular member 120 between the pin 133 and the input port 122, and the lock nut 146 has a first inner bore 148 adapted to fit slidably around the outer diameter of the third tubular member 120, and a second inner bore 150 coaxial with the first inner bore 148, and having a diameter and internal threads adapted to engage the external threads 144 of the second end portion 132 of the inner collar 124. The lock nut 146, including the second inner bore 150, is sized such that when the third tubular member 120 is fitted into the inner collar 124 and the pin 133 is captured at the closed end of the L-shaped slot, not shown, by the grooves 138, in the outer collar 134, the pin 133 will be further retained within the L-shaped slot by the bushing end 147.

A lock nut 146 is similarly provided on the second tubular member 112 between the pin 133 at one end and the coupling 114 at the other end for locking the coupling 114 which attaches the first tubular member 110 to the second tubular member 112. The lock nut 146 cannot be easily removed from either tubular member, and firefighters will be discouraged from attempting such removal during the excitement of fighting a fire.

Use of the lock nut is assured since the lock nut 146 will be freely slidable on the tubular member and hamper the usage of the tool unless it is properly secured. Once secured, the lock nut 146 will further retain the tool in assembled relationship even when the tool is violently twisted, pushed and pulled in the course of inserting the tool into or removing the tool from a barrier, and thereby protect the firefighters against injury from the explosive release of water pressure which would occur upon unexpected disassembly of the parts.

Finally, the coupling 114 is provided with tapered end sections. The end 125 of the inner collar 124 and the adjacent end of the outer collar 134 having exterior tapered sections 152, 153, respectively, which present a gentle widening of the tool when the tubular members are locked into assembled relationship, and a similar tapered section 154 is provided on the distal end 154 of the lock nut 146. The taper sections 152, 153, 154 permit the tool, including the coupling 114 to be easily and rapidly inserted into a hole in a barrier, and to be removed from such a barrier, during the course of fighting a fire, without catching the tool on a shoulder of the coupling. The external coupling 41, 114 as described above does not restrict the flow of liquid through the tool and provides great strength which may be needed if the tool is abused, such as by a pry bar, or being tossed from the roof of a building.

Other aspects, objects and advantages of the inventions can be obtained from a study of the drawings, the specification and the appended claims.

What is claimed is:

1. A firefighting tool of modular construction comprising:
   a nozzle comprising an elongated body including an outer surface and having a bore partially therethrough defining a bore open end and an inner surface, a plurality of apertures extending through said body to said bore, each said aperture defining an axis with the respective axis of each said aperture intersecting outwardly from said outer surface with the axis of another of said apertures such that pressurized liquid flowing through each of said apertures impacts upon the liquid flowing through another of said apertures to create a fog, and a diverging solid front portion;
   a first tubular member having an outer diameter, an outer surface, and first and second open ends and defining a passageway therebetween wherein said first open end is connected to said bore open end so that said passageway is in communication with said nozzle bore;
   a tubular end member having an outer diameter, an outer surface, and an open end and an inlet port having a means to couple said inlet port to a source of the pressurized liquid;
   an inner collar on one of said first tubular member and said tubular end member, said inner collar having an inner diameter a little larger than said outer diameter of another one of said first tubular member and said tubular end member, said inner collar having an L-shaped groove therein;
   a pin extending above said outer surface of said another one of said first tubular member and said tubular end member;
   an outer collar longitudinally slidable over said inner collar; and
   capture means on said outer collar for capturing said pin in said L-shaped groove and retaining said first tubular member and said tubular end member in coupled relationship;
   whereby the liquid from the source of the liquid passes through said end member, said first member, said bore, and finally to said apertures.

2. A firefighting tool of modular construction comprising:
   a nozzle comprising an elongated body including an outer surface and having a bore partially therethrough defining a bore open end and a bore inner surface, a plurality of apertures extending through said body to said bore, each said aperture defining an axis with the respective axes of each said aperture intersecting outwardly from said outer surface with the axis of another of said apertures such that pressurized liquid flowing through each of said apertures impacts upon a flow of the liquid from another of said apertures, outwardly of said outer surface, to create a fog, said nozzle having a diverging solid front portion;
   a first tubular member having first and second open ends and defining a passageway therebetween wherein said first open end is connected to said bore open end so that said passageway is in communication with said nozzle bore;
   a tubular intermediate member having first and second open ends and defining a passageway therebetween;
   a tubular end member including an open end and an inlet port having means to couple said inlet port to a source of the pressurized liquid; and
   first and second quick connect/disconnect coupling means for respectively coupling said intermediate member to said first tubular member at the second open ends thereof and said open end of said end member to said first open end of said intermediate member,
   whereby the liquid from the source of the liquid passes through said end member, said intermediate member, said first member, said bore, and finally to said apertures;
   wherein each said coupling means comprises an inner collar on one of said members, said inner collar having an inner diameter a little larger than an outer diameter of another of said members, said inner collar having an L-shaped groove therein,
   a pin in said another of said members,
   an outer collar longitudinally slidable over said inner collar, and
   capture means on said outer collar for capturing said pin in said L-shaped groove and retaining said one and said another of said members in coupled relationship.

3. A firefighting tool of modular construction comprising:
   a nozzle comprising an elongated body including an outer surface and having a bore partially therethrough defining a bore open end and a bore inner surface, a plurality of apertures extending through said body to said bore, each said aperture defining an axis with the respective axes of each said aperture intersecting outwardly from said outer surface with the axis of another of said apertures such that pressurized liquid flowing through each of said apertures impacts upon the liquid flowing through another of said apertures to create a fog, and a diverging solid front portion;
   a first tubular member having first and second open ends and defining a passageway therebetween wherein said first open end is connected to said bore open end so that said passageway is in communication with said nozzle bore;
   a tubular end member including an open end and an inlet port having means to couple said inlet port to a source of the pressurized liquid;
   coupling means for coupling said first tubular member and said end member,
   whereby the liquid from the source of the liquid passes through said end member, said first member, said bore, and finally to said apertures;
   a lock nut, slidable along one of said first tubular member and said tubular end member, for locking said coupling means to maintain said first tubular member and said tubular end member in coupled relationship;
   retaining means for retaining said lock nut from sliding off an end of said one of said first tubular member and said tubular end member when said lock nut is disconnected from said coupling means;
   an inner collar on one of said first tubular member and said tubular end member, said inner collar having an inner diameter a little larger than an outer diameter of another of said first tubular member and said tubular end member, said inner collar having an L-shaped groove therein;

a pin extending above the outer surface of said another of said first tubular member and said tubular end member;

an outer collar longitudinally slidable over said inner collar; and capture means on said outer collar for capturing said pin in said L-shaped groove and retaining said first tubular member and said tubular end member in coupled relationship.

* * * * *

UNITED STATES PATENT AND TRADEMARK OFFICE
CERTIFICATE OF CORRECTION

PATENT NO.  : 5,253,716
DATED       : October 19, 1993
INVENTOR(S) : Wallace F. Mitchell It is certified that error appears in the above-identified patent and that said Letters Patent is hereby corrected as shown below:

On the title page, and Column 1, line 2, after "FOG" delete "PRODICIG"

substitute -- PRODUCING --.

In column 3, line 7, after "the" delete "lien" and substitute -- line --.

In column 5, line 29, after "maximize" insert --.--

Signed and Sealed this

Second Day of August, 1994

Attest:

BRUCE LEHMAN

Attesting Officer

Commissioner of Patents and Trademarks